US010860279B2

(12) United States Patent
Lieb et al.

(10) Patent No.: US 10,860,279 B2
(45) Date of Patent: Dec. 8, 2020

(54) METHOD AND SYSTEM FOR BROWSER-BASED SCREEN SHARING

(71) Applicant: CLEARSLIDE, INC., San Francisco, CA (US)

(72) Inventors: Adam Michael Lieb, San Francisco, CA (US); James L. Benton, San Francisco, CA (US); Zack Thomsen-Gray, Albany, CA (US); Brad Tofel, San Francisco, CA (US)

(73) Assignee: CLEARSLIDE, INC., Austin, TX (US)

( * ) Notice: Subject to any disclaimer, the term of this patent is extended or adjusted under 35 U.S.C. 154(b) by 0 days.

(21) Appl. No.: 15/632,126

(22) Filed: Jun. 23, 2017

(65) Prior Publication Data

US 2017/0300286 A1 Oct. 19, 2017

Related U.S. Application Data

(63) Continuation of application No. 14/448,620, filed on Jul. 31, 2014, and a continuation-in-part of (Continued)

(51) Int. Cl.
*G06F 3/14* (2006.01)
*G06F 3/0481* (2013.01)
(Continued)

(52) U.S. Cl.
CPC .......... *G06F 3/1454* (2013.01); *G06F 3/0481* (2013.01); *H04L 65/4015* (2013.01);
(Continued)

(58) Field of Classification Search
CPC . G06F 3/1454; H04L 67/101; H04L 67/1008; H04L 67/1021
See application file for complete search history.

(56) References Cited

U.S. PATENT DOCUMENTS 5,654,726 A    8/1997   Mima et al.
6,295,551 B1   9/2001   Roberts et al.
(Continued)

FOREIGN PATENT DOCUMENTS

WO    2009140766 A1    2/2009

OTHER PUBLICATIONS

Final Office Action dated Jul. 27, 2017 for U.S. Appl. No. 14/448,620 of Lieb, A.M. et al. filed Jul. 31, 2014.
(Continued)

*Primary Examiner* — Asher D Kells
(74) *Attorney, Agent, or Firm* — Lowenstein Sandler LLP

(57) ABSTRACT

Techniques are disclosed for facilitating browser-based screen sharing using scripting computer language codes that are directly executable by a web browser. An example method comprises loading a presentation webpage in a presenter's web browser. The presentation webpage includes scripting language codes that are configured to cause the presenter's web browser to capture a screen image without requiring the presenter's web browser to load an applet. The method further includes receiving data indicative of the captured screen image from the presenter device, wherein the data is generated by the scripting language codes, processing the received data to form a processed screen image that is in an image format natively displayable to a viewer's web browser, and transmitting a viewer webpage including the processed screen image to the viewer's web browser.

21 Claims, 11 Drawing Sheets

Related U.S. Application Data application No. 12/953,054, filed on Nov. 23, 2010, now Pat. No. 9,733,886.

(60) Provisional application No. 61/860,647, filed on Jul. 31, 2013, provisional application No. 61/264,185, filed on Nov. 24, 2009.

(51) Int. Cl.
    *H04L 29/06*     (2006.01)
    *H04L 29/08*     (2006.01)

(52) U.S. Cl.
    CPC ........ *H04L 67/101* (2013.01); *H04L 67/1008* (2013.01); *H04L 67/1021* (2013.01); *G09G 2370/02* (2013.01); *H04L 67/02* (2013.01)

(56) References Cited

U.S. PATENT DOCUMENTS

| | | | |
|---|---|---|---|
| 7,124,745 B2 | 10/2006 | Glassburn et al. | |
| 7,127,745 B1 | 10/2006 | Herse et al. | |
| 7,533,146 B1 | 5/2009 | Kumar et al. | |
| 9,471,694 B2 | 10/2016 | Lieb et al. | |
| 10,129,319 B2* | 11/2018 | Eriksson | H04L 65/1069 |
| 2002/0013833 A1 | 1/2002 | Wyatt et al. | |
| 2002/0016861 A1 | 2/2002 | Simonoff | |
| 2002/0038346 A1 | 3/2002 | Morrison et al. | |
| 2002/0073155 A1 | 6/2002 | Anupam et al. | |
| 2002/0194611 A1 | 12/2002 | Hodgkinson | |
| 2003/0182375 A1 | 9/2003 | Zhu et al. | |
| 2003/0212744 A1 | 11/2003 | Dunlap et al. | |
| 2004/0075619 A1* | 4/2004 | Hansen | G06F 3/1454 |
| | | | 345/1.1 |
| 2004/0080504 A1 | 4/2004 | Salesky et al. | |
| 2004/0083236 A1* | 4/2004 | Rust | G06F 17/30873 |
| 2004/0139156 A1 | 7/2004 | Matthews et al. | |
| 2004/0181579 A1 | 9/2004 | Huck et al. | |
| 2004/0230825 A1 | 11/2004 | Shepherd et al. | |
| 2004/0240752 A1* | 12/2004 | Dobbs | H04N 7/17318 |
| | | | 382/276 |
| 2005/0132299 A1 | 6/2005 | Jones et al. | |
| 2006/0075359 A1 | 4/2006 | Bauchot et al. | |
| 2006/0218285 A1 | 9/2006 | Talwar et al. | |
| 2006/0266325 A1 | 11/2006 | Sergeev et al. | |
| 2007/0208992 A1 | 9/2007 | Koren et al. | |
| 2007/0245248 A1 | 10/2007 | Christiansen | |
| 2007/0266325 A1 | 11/2007 | Helm et al. | |
| 2007/0294626 A1 | 12/2007 | Fletcher et al. | |
| 2008/0016155 A1* | 1/2008 | Khalatian | G06F 3/038 |
| | | | 709/204 |
| 2008/0059583 A1 | 3/2008 | Mao et al. | |
| 2008/0162635 A1* | 7/2008 | Keren | H04M 3/567 |
| | | | 709/204 |
| 2008/0267178 A1 | 10/2008 | Emmerich et al. | |
| 2009/0055822 A1 | 2/2009 | Tolman et al. | |
| 2009/0292999 A1 | 11/2009 | LaBine et al. | |
| 2010/0228824 A1* | 9/2010 | Lin | H04L 12/1818 |
| | | | 709/204 |
| 2010/0257449 A1 | 10/2010 | Lieb et al. | |
| 2010/0268694 A1* | 10/2010 | Denoue | G06F 16/954 |
| | | | 707/693 |
| 2011/0083076 A1 | 4/2011 | Kang et al. | |
| 2011/0093773 A1* | 4/2011 | Yee | G06F 17/30896 |
| | | | 715/235 |
| 2011/0126130 A1* | 5/2011 | Lieb | G06F 3/1454 |
| | | | 715/753 |
| 2011/0154219 A1* | 6/2011 | Khalatian | G06F 3/1462 |
| | | | 715/751 |
| 2011/0173256 A1 | 7/2011 | Khalatian et al. | |
| 2011/0276619 A1* | 11/2011 | Khan | H04L 67/141 |
| | | | 709/203 |
| 2011/0276900 A1 | 11/2011 | Khan et al. | |
| 2012/0030579 A1 | 2/2012 | Morard et al. | |
| 2012/0191784 A1* | 7/2012 | Lee | H04N 21/234327 |
| | | | 709/205 |
| 2012/0317487 A1 | 12/2012 | Lieb et al. | |
| 2013/0083210 A1* | 4/2013 | Beckham | H04N 21/4223 |
| | | | 348/207.11 |
| 2013/0268807 A1* | 10/2013 | Spencer | G06F 11/1415 |
| | | | 714/18 |
| 2014/0032735 A1* | 1/2014 | Kapoor | G06F 3/1454 |
| | | | 709/224 |
| 2014/0126708 A1 | 5/2014 | Sayko et al. | |
| 2014/0126714 A1* | 5/2014 | Sayko | H04L 65/1069 |
| | | | 379/265.09 |
| 2014/0143672 A1* | 5/2014 | Kim | G06Q 10/101 |
| | | | 715/733 |
| 2015/0002619 A1* | 1/2015 | Johnston | H04L 65/607 |
| | | | 348/14.12 |
| 2015/0006611 A1* | 1/2015 | Johnston | H04L 67/02 |
| | | | 709/202 |
| 2015/0039998 A1 | 2/2015 | Lieb et al. | |
| 2017/0118258 A1 | 4/2017 | Lieb | |

OTHER PUBLICATIONS

Notice of Allowance dated Jun. 6, 2017 for U.S. Appl. No. 12/953,054 of Lieb, A.M. filed Nov. 23, 2010.
"Accomplish Screen Sharing Using WebRTC", Stack Overflow; stackoverflow.com/questions/17542384/accomplish-screen-sharing-using-webrtc, 3 pages.
"Screen Sharing with WebRTC", Stack Overflow; stackoverflow.com/questions/13616449/screen-sharing-with-webrtc, 3 pages.
Advisory Action dated Apr. 5, 2016, for U.S. Appl. No. 12/953,054, of Lieb et al. filed Nov. 23, 2010.
Advisory Action dated Jun. 7, 2016 in U.S. Appl. No. 13/841,237 of Lieb, A. et al., filed Mar. 15, 2013.
Advisory Action dated Oct. 11, 2016, in U.S. Appl. No. 14/448,620 of Lieb A. et al. filed Jul. 31, 2014.
Berena, A.J. et al., "Shared Virtual Presentation Board fore-communication on the WebELS Platform", in: the 18th International Conference on Computers in Education (ICCE 2010), pp. 280-284, 2010.
Corrected Notice of Allowability dated Nov. 4, 2016, for U.S. Appl. No. 12/953,054, of Lieb et al., filed Nov. 23, 2010.
Corrected Notice of Allowability dated Oct. 28, 2016, for U.S. Appl. No. 12/953,054, of Lieb et al., filed Nov. 23, 2010.
Dutton, Sam , "Screensharing with WebRTC", Google Developers; retrieved from https://developers.google.com/web/updates/2012/12/Screensharing-with-WebRTC, Dec. 2012, 4 pages.
Extended European Search Report dated Feb. 25, 2016, for European Patent Application No. 12793430.5.
Final Office Action dated Aug. 9, 2013, in U.S. Appl. No. 12/953,054, filed Nov. 23, 2010.
Final Office Action dated Dec. 17, 2015, for U.S. Appl. No. 12/953,054, of Lieb et al. filed Nov. 23, 2010.
Final Office Action dated Feb. 11, 2016, U.S. Appl. No. 13/841,237 of Lieb et al. filed Mar. 15, 2013.
Final Office Action dated Jan. 15, 2015, in U.S. Appl. No. 13/484,253 of Lieb et al., filed May 30, 2012.
Final Office Action dated Jun. 27, 2016 in U.S. Appl. No. 14/448,620 of Lieb, A. et al. filed Jul. 31, 2014.
Final Office Action dated Mar. 1, 2017, in U.S. Appl. No. 14/448,620 of Lieb, A. et al. filed Jul. 31, 2014.
International Search Report and Written Opinion dated Jan. 31, 2013, for International Application No. PCT/US2012/040054.
International Search Report and Written Opinion dated Nov. 10, 2014, for International Application No. PCT/US2014/049180.
International Search Report and Written Opinion dated Oct. 18, 2013, for International Application No. PCT/US2013/048327.
Non-Final Office Action dated Apr. 12, 2016, U.S. Appl. No. 14/448,620 of Lieb, A.M. et al. filed Jul. 31, 2014.
Non-Final Office Action dated Aug. 14, 2014, U.S. Appl. No. 13/484,253, filed May 30, 2012.
Non-Final Office Action dated Dec. 12, 2016, U.S. Appl. No. 14/448,620 of Lieb, A.M. et al. filed Jul. 31, 2014.

(56) References Cited

OTHER PUBLICATIONS

Non-Final Office Action dated Dec. 14, 2012, in U.S. Appl. No. 12/953,054, filed Nov. 23, 2010.
Non-Final Office Action dated Jul. 16, 2015, for U.S. Appl. No. 12/953,054 of Lieb, A.M., et al., filed Nov. 23, 2010.
Non-Final Office Action dated Oct. 5, 2016 in U.S. Appl. No. 13/841,237 of Lieb A. et al., filed Mar. 15, 2013.
Non-Final Office Action dated Sep. 4, 2015, for U.S. Appl. No. 13/841,237 of Lieb et al. filed Mar. 15, 2013.
Notice of Allowance dated Apr. 13, 2015, in U.S. Appl. No. 13/484,253 of Lieb et al., filed May 30, 2012.
Notice of Allowance dated Jul. 16, 2015, in U.S. Appl. No. 13/484,253 of Lieb et al., filed May 30, 2012.
Notice of Allowance dated Jun. 6, 2016, in U.S. Appl. No. 13/484,253 of Lieb et al., filed May 30, 2012.
Notice of Allowance dated Oct. 4, 2016, for U.S. Appl. No. 12/953,054, of Lieb et al., filed Nov. 23, 2010.
Richardson, Tristan et al., "Virtual Network Computing", IEEE Internet Computing vol. 2 No. 1, Jan./Feb. 1998, pp. 33-38.
U.S. Appl. No. 12/953,054 of Lieb et al., filed Nov. 23, 2010.
U.S. Appl. No. 13/484,253 of Lieb et al. filed May 30, 2012.
U.S. Appl. No. 13/841,237 of Lieb et al. filed Mar. 15, 2013.
U.S. Appl. No. 14/448,620 of Lieb, A.M. et al. filed Jul. 31, 2014.

\* cited by examiner

METHOD AND SYSTEM FOR BROWSER-BASED SCREEN SHARING

CROSS-REFERENCE TO RELATED APPLICATIONS

This application is a continuation-in-part (CIP) application of U.S. patent application Ser. No. 12/953,054, entitled "METHOD AND SYSTEM FOR BROWSER-BASED SCREEN SHARING," filed on Nov. 23, 2010, which claims the benefit of U.S. Provisional Application No. 61/264,185, entitled "METHOD FOR BROWSER-BASED SCREEN SHARING," filed Nov. 24, 2009, and is a continuation application of U.S. patent application Ser. No. 14/448,620 entitled "SCREEN SHARING USING SCRIPTING COMPUTER LANGUAGE CODE DIRECTLY EXECUTABLE BY WEB BROWSER," filed on Jul. 31, 2014, which claims the benefit of U.S. Provisional Application No. 61/860,647 entitled "SCREEN SHARING USING SOFTWARE CODE WHOLLY IMPLEMENTED WITHIN WEB PAGES ACCESSIBLE VIA WEB BROWSER," filed Jul. 31, 2013; all of which are incorporated by reference herein in their entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the United States Patent and Trademark Office patent files or records, but otherwise reserves all copyright rights whatsoever. The following notice applies to the software and data as described below and in the drawings that form a part of this document: Copyright 2014, ClearSlide, Inc., All Rights Reserved.

TECHNICAL FIELD

The present disclosure relates to sharing computer screens to remote computers, and more specifically, to sharing the presenter's screen to one or more viewers over a communications network (e.g., the Internet) using scripting computer language codes that are directly executable by a web browser.

BACKGROUND

Often it is useful for a presenter working on a computer to broadcast a portion of the images shown on the computer screen over a network to remote viewers, such as to demonstrate the capabilities of a software product or website. Several commercial solutions, such as WebEx™ and GoToMyPC™, offer screen sharing related products. Although useful, in these screen sharing products the presenters must download and install software (such as executables or plug-ins) to the presentation computer, while the viewer must complete a time-consuming setup process, which can include software downloads and email-based invitation setup process, to connect the viewer to the presenter. These limitations prevent the usage in certain situations, such as a sales call, and they limit the devices upon which these products can run.

BRIEF DESCRIPTION OF DRAWINGS

The present embodiments are illustrated by way of example and are not intended to be limited by the figures of the accompanying drawings. In the drawings.

The same reference numbers and any acronyms identify elements or acts with the same or similar structure or functionality throughout the drawings and specification for ease of understanding and convenience.

DETAILED DESCRIPTION

Techniques are disclosed for facilitating browser-based screen sharing using scripting computer language codes that are directly executable by a web browser. An example method comprises loading a presentation webpage in a presenter's web browser. The presentation webpage includes scripting language codes that are configured to cause the presenter's web browser to capture a screen image without requiring the presenter's web browser to load an applet, which would require to be executed by a process separate from the presenter's web browser on the presenter device. The method further includes receiving data indicative of the captured screen image from the presenter device, wherein the data is generated by the scripting language codes. The method further includes processing the received data to form a processed screen image that is in an image format natively displayable to a viewer's web browser. In addition, the method includes transmitting a viewer webpage including the processed screen image to the viewer's web browser.

Among other benefits, some embodiments provided herein enable browser-based screen sharing capabilities for a presenter to one or more viewers without requiring a software application to be installed on the presenter's computer, nor a plugin (e.g., a Java plugin) to be installed with the presenter's web browser for executing an applet (e.g., a Java applet).

Various examples of the present disclosure will now be described. The following description provides specific details for a thorough understanding and enabling description of these examples. One skilled in the relevant art will understand, however, that the embodiments disclosed herein may be practiced without many of these details. Likewise, one skilled in the relevant art will also understand that the present embodiments may include many other obvious features not described in detail herein. Additionally, some well-known methods, procedures, structures or functions may not be shown or described in detail below, so as to avoid unnecessarily obscuring the relevant description.

The techniques disclosed below is to be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

System Overview

Figure 1A:
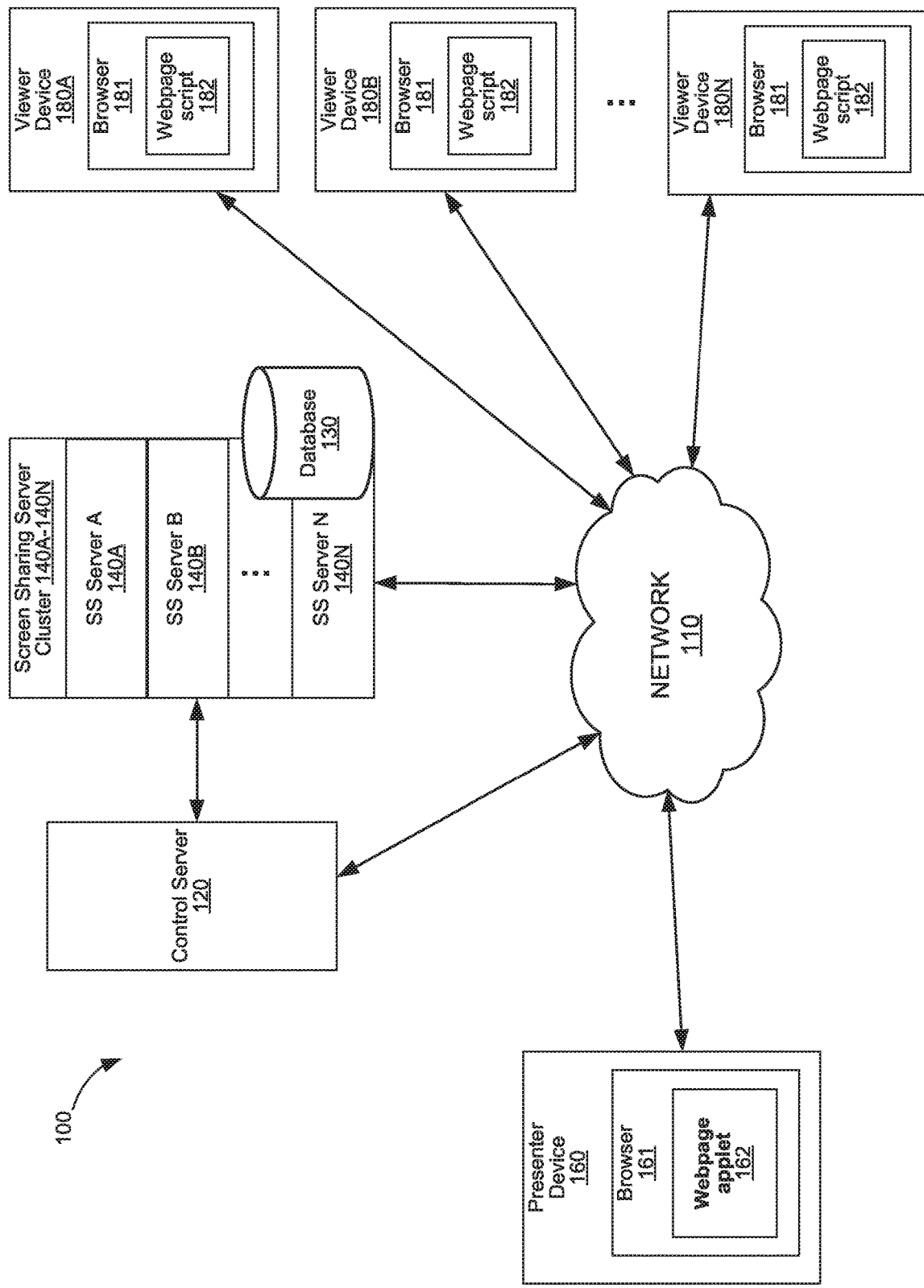
FIG. 1A depicts a diagram of an environment within which the present embodiments may be implemented.

FIG. 1A depicts a diagram of an environment including a system 100 within which the present embodiments may be implemented. The system 100 includes a presenter operating a presenter device 160, one or more viewers operating viewer devices 180A-180N, a screen sharing server 140 (which is collectively represented by a screen sharing cluster 140A-140N, and optionally in some embodiments, a presentation control server 120), and a network 110.

The viewer devices 180 and the presenter device 160 can be any system and/or device, and/or any combination of devices/systems that is able to establish a connection, including wired, wireless, cellular connections with another device, a server and/or other systems such as the screen sharing server 140. The viewer devices 180 and the presenter device 160 typically include a display and/or other output functionalities to present information and data exchanged between or among the devices 180, 160 and/or the screen sharing server 140. In one embodiment, there is only a single screen sharing server 140. In one or more embodiments, there are multiple screen sharing servers 140 operating collectively or independently, such as the screen sharing server cluster 140A-140N illustrated in FIG. 1A.

The viewer devices 180 and the presenter device 160 may include computing devices such as mobile (or portable) devices or non-portable devices. Non-portable devices can include a desktop computer, a computer server or cluster. Portable devices can including a laptop computer, a mobile phone, a smart phone, a personal digital assistant (PDA), a handheld tablet computer, or a combination thereof. Typical input mechanism on client devices 102A-N can include a touch screen display (including a single-touch (e.g., resistive) type or a multi-touch (e.g., capacitive) type), gesture control sensors (e.g., for 2D or 3D gesture sensing), a physical keypad, a mouse, motion detectors (e.g., including 1-axis, 2-axis, 3-axis accelerometer, etc.), light sensors, temperature sensor, proximity sensor, device orientation detector (e.g., electronic compass, gyroscope, or GPS), and so forth. Note that those skilled in the art will be familiar with the computer systems suitable for use in implanting servers and user devices.

In one example, the viewer devices 180, screen sharing server 140, and presenter's device 160 are coupled via the network 110. In some other examples, the viewer devices 180, the presenter device 160, and screen sharing server 140 may be directly connected to one another.

In those embodiments with the presentation control server 120, the presentation control server 120 sets up an environment for the screen sharing. For example, the presentation control server 120 can give a presenter the tools to navigate through the slides of the presentation, and then, when the presenter reaches a screen sharing slide, display the appropriate web pages to the presenter and viewers. The presentation control server 120 can also act as a load balancer. In this case, the presentation control server can consider the geographic and/or network locations of the presenters, viewers, and sharing servers and the current load of each sharing server, and then pick the best sharing server (e.g., among the screen sharing server cluster 140A-140N) to use which minimizes transmission distance while also distributing load. In one example, the presentation control server 120 act as a central sever that determines to which of the screen sharing servers 140A-140N the server 120 should direct a given screen sharing session. Afterwards, the designated shared server (e.g., SS server 140A) will act as the intermediate component between the presenter device 160 and the viewer devices 180 for performing screen sharing.

As mentioned before, the presentation control server 120 is an optional component. Screen sharing can be implemented without a separate control server, e.g., if screen sharing is not operating in the context of a larger presentation. That is, the presentation control server 120 can be useful for setting up the context in which the screen sharing operates but is not necessary. Alternatively, the functionality of the presentation control server 120 can be implemented on the presenter sharing server 140, the presenter device 160, or distributed across several different systems.

The system 100 supports screen sharing of a presenter's screen on the presenter device 160 via the network 110 and the screen sharing server 140 to one or more viewers operating viewer devices 180A-180N, regardless of whether one or more typically required plugins (e.g., a Java plugin) are installed with viewers' browsers 181. Such technique is described in more detail in U.S. patent application Ser. No. 12/756,110, filed Apr. 7, 2010, entitled "MIXED CONTENT TYPE PRESENTATION SYSTEM," which is incorporated by reference herein in its entirety.

The presenter device 160 and the viewer devices 180 should each be capable of running a web browser 161, 181. The viewer device web browser 181 is used by the viewer operating the viewer device 180 to access a uniform resource locator (URL) to gain access to a viewer's page, which includes webpage scripts 182 (e.g., Java scripts) that can download a series of images (e.g., from the screen sharing servers 140) of a shared screen of the presenter's device 160 for the viewers to view. The webpage scripts 182 (e.g., Javascripts) can also enable the viewers to perform a variety of functions (e.g., interacting with the presenter). For example, some embodiments of the webpage script 182 embedded in the viewer's page can detect input or control events made by the viewer's input mechanism, such as mouse movements, clicks, mouse wheel rotations, or keyboard strokes, and sends the control events to the server 140.

However, it is recognized here that, in current screen sharing products, the presenter may still need to run an applet 162 on the presentation device 160. In a particular example, a screen sharing webpage containing a sharing applet or an embedded applet 162 (e.g., a Java applet) is to be loaded in the web browser 161 running on the presenter device 160. The applet 162 contains the software code that can capture screenshots of the presenter's screen and upload the screenshots to the screen sharing servers 140, so that screens can be shared with viewers who access the provided viewer URL. Running such applet (e.g., a Java applet) typically requires permission and installation of a plug-in (e.g., a Java plug-in) software with the presenter's browser 161 on the presenter's device 160, thereby create technical difficulty, time delay, and frustration. Also, operating the plug-in software creates a process (or thread) (e.g., a Java Virtual Machine (JVM)) that is separate from the presenter's web browser 161 on the presenter device 160, and this can increase the resource consumption on (thereby slowing down) the presenter device 160.

Accordingly, one or more embodiments of the present disclosure provide screen sharing techniques using only scripting computer language codes that are directly executable by the presenter's web browser 161. The present disclosure enables the presenter to use a stock web browser, without installing any plug-in software, to perform screen sharing functionalities with the viewer devices 180 via the screen sharing server 140.

Figure 1B:
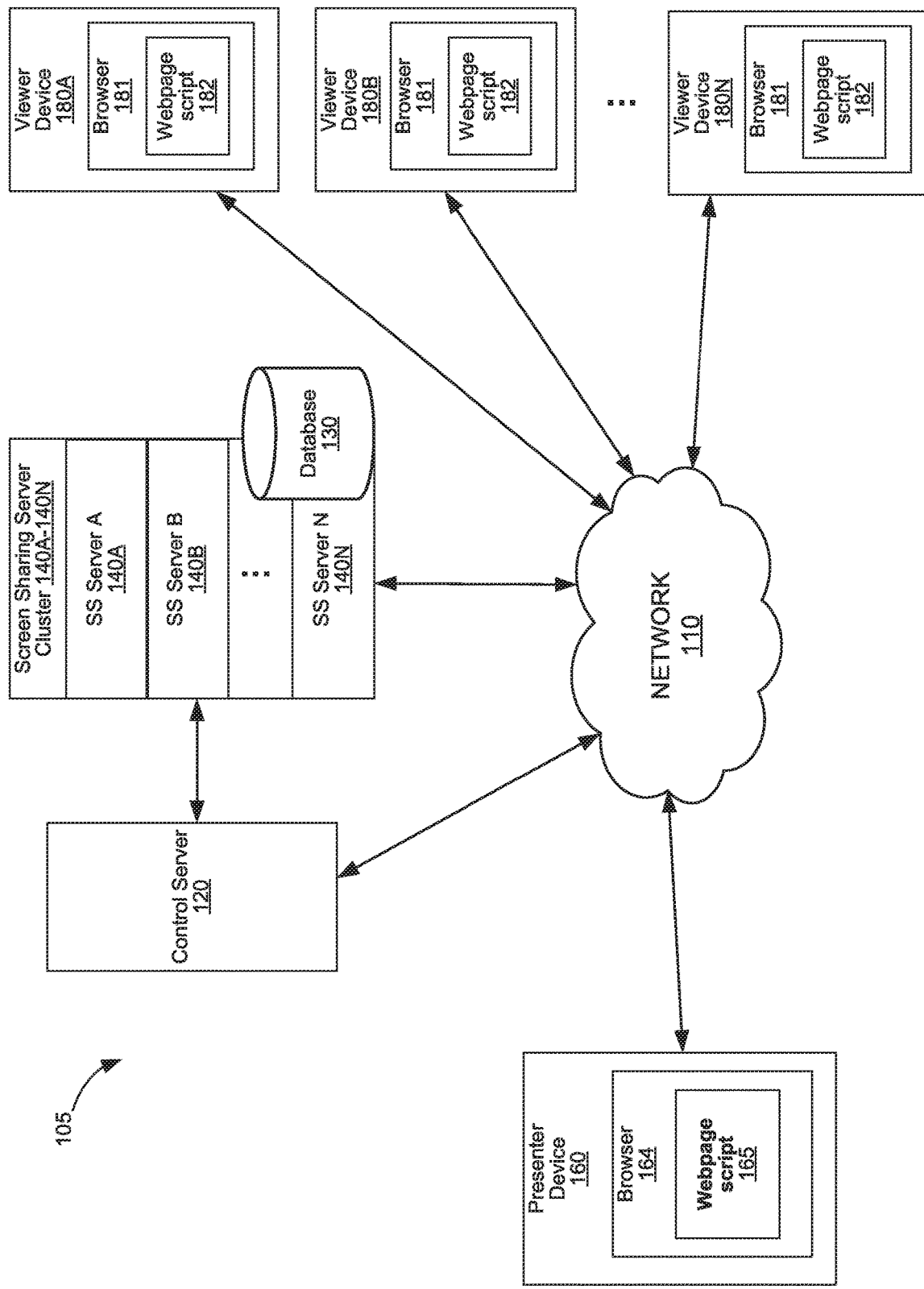
FIG. 1B depicts a diagram of an exemplary system of implementing the techniques introduced here.

FIG. 1B depicts a diagram of an exemplary system 105 implementing the techniques introduced here. The system 105 includes the same devices as the system 100, including the presenter device 160, the viewer devices 180A-180N, the screen sharing server cluster 140A-140N, the presentation control server 120, and the network 110, only that at least some of them are configured differently. Specifically, in the system 105, the presenter's browser 164 need not have the webpage applet 162 (e.g., a Java applet) installed, but instead, the presenter's browser 164 can utilize one or more techniques introduced here to perform screen sharing functionalities. In some embodiments, the presenter's web browser 164 includes capability to perform plug-in-free real-time communication (RTC) with another browser. Examples of such capability include WebRTC, CU-RTC-WEB, and so forth. Overall, the technique introduced here can utilize the presenter's web browser 164's built-in capability so as to reduce or completely remove the need of the webpage applet 162.

For purposes of discussion herein, a webpage script (e.g., Javascript) means a piece of software code that is written in scripting computer programming language, which can be directly executed (e.g., without being compiled by a compiler first) by a web browser. A scripting language is most commonly used and implemented as client-side scripts to facilitate interaction with the user, control the browser, communicate asynchronously, alter the document content that is displayed, and so forth. A person skilled in the art will know that it typically only takes an interpreter (e.g., a software application such as a web browser) to directly executes, i.e. performs, instructions written in a programming or scripting language, without previously compiling them into a machine language program.

Specifically, to facilitate screenshot capturing, the presenter's webpage that is loaded in the presenter's web browser 164 need only to include webpage script 165 (e.g., a Javascript) in lieu of the webpage applet 162. In some embodiments, the presenter's webpage only contains webpage script 165 and does not include any webpage applet 162. In variations, the presenter's webpage can contain both webpage script 165 and webpage applet 162, but only the webpage script 165 performs the screenshot capturing. The webpage script 165 leverages the built-in functionalities that are embedded within the web browser 164. In one or more embodiments, the presenter's webpage that is loaded onto the presenter's web browser can automatically determine the browser's capability (e.g., such as whether the browser supports plug-in-free RTC with another browser) in order to determine whether to require the web applet 162 or simply include the webpage script 165 for screen sharing. Such automatic determination can be achieved by, for example, inspecting the headers of the page requests that are sent to the presentation control server 120 to identify the web browser's type and ability.

More specifically, it is observed that, when the web browser 164 is equipped with built-in (therefore, plug-in-free) RTC capability with another browser, this capability can be adapted by the present embodiments to realize screen sharing using only the webpage script 165 without requiring a webpage applet. Conventionally, the RTC capability (e.g., WebRTC) of the web browser 164 is designed to enable browser-to-browser applications for voice calling, video chat, and peer-to-peer (P2P) file sharing without plugins. In other words, native web browser RTC capability can enable direct video streaming from one browser to another via the network 110 (e.g., the Internet). However, RTC at its full capability may require a network bandwidth that is too large, and a computing machine too powerful, thereby making pure RTC less ideal for screen sharing in presentation scenarios. Additionally, relying solely on web browsers' RTC capability to implement browser-to-browser screen sharing would typically require both the presenter device 160 and the viewer devices 180 to have equivalent/compatible RTC functions, making it cumbersome for purposes of screen sharing during presentations (e.g., of a sales pitch). Furthermore, the RTC functions may be blocked by network administrators or other firewall settings, which may be typical for big companies or other commercial settings. These drawbacks have traditionally limited the RTC's applicability on screen sharing applications.

Briefly described, in accordance with some aspects of the technique introduced here, the webpage script 165 can be loaded onto the presenter's browser 164 so that the webpage script 165 can capture a screen image from a display of the presenter device 160 without requiring the web browser 164 to load an applet, which would typically require execution by a process or a thread separate from the web browser 164 on the presenter device 160. More precisely, embodiments of the webpage script 165 adapts the RTC functionality of the web browser 164 so that, instead of being used for video streaming with another browser (thus incurring all the aforementioned issues), the webpage script 165 instructs the web browser 164 to capture static screenshots of the presenter device 160. In some embodiments, the webpage script 165 does so via an application programming interface (API) of the presenter's web browser 164. Then, the webpage script 165 processes the captures screenshots, and send the screenshots to the screen sharing servers 140. The screen sharing servers 140 can thereafter transmit the screenshots to one or more of the view devices 180.

Figure 2:
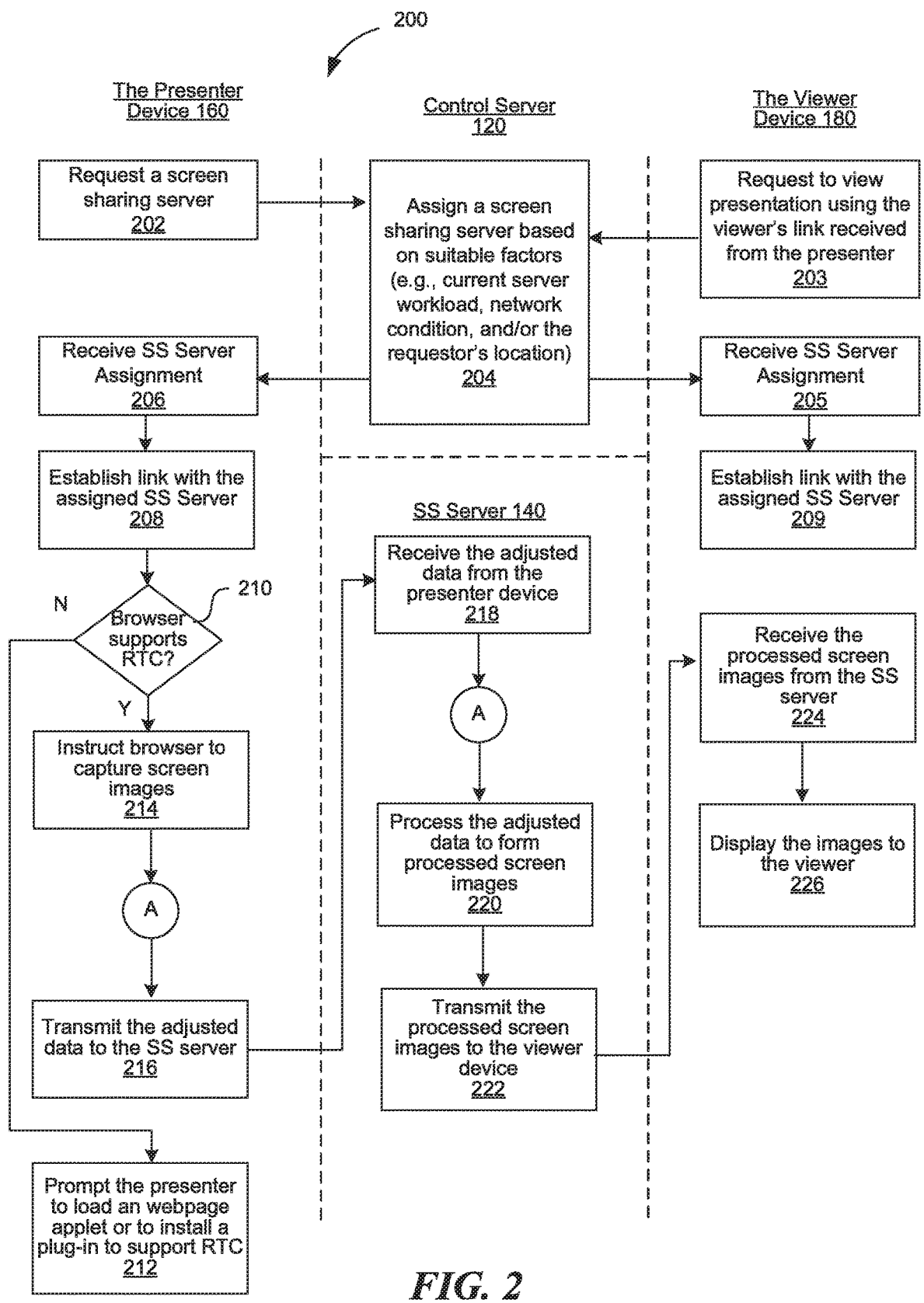
FIG. 2 depicts a flowchart illustrating an example of actions performed among the presenter device, presentation server(s), and one or more viewer devices for carrying out screen sharing using scripting computer language codes that are directly executable by a web browser.
Figure 3:
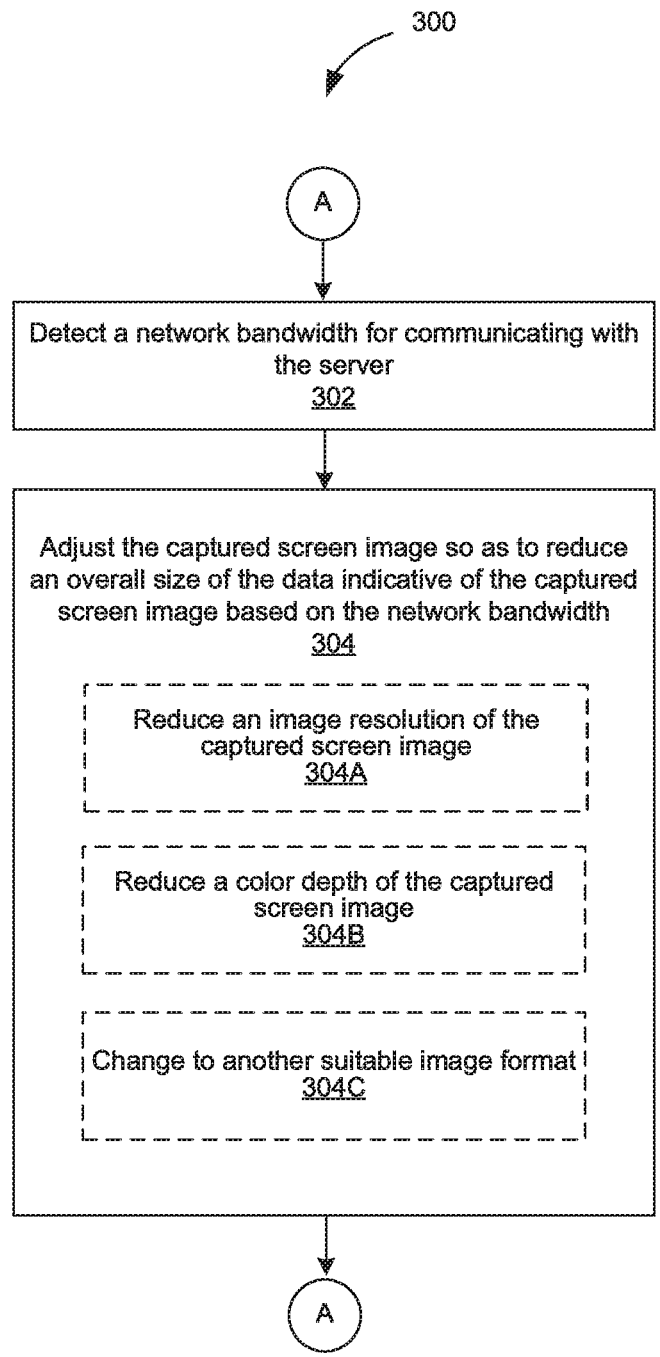
FIG. 3 depicts a flowchart illustrating an example process performed (e.g., by the presenter device as being instructed by the scripting language codes, or by the screen sharing server) for adaptively adjusting the captured screen image.
Figure 4:
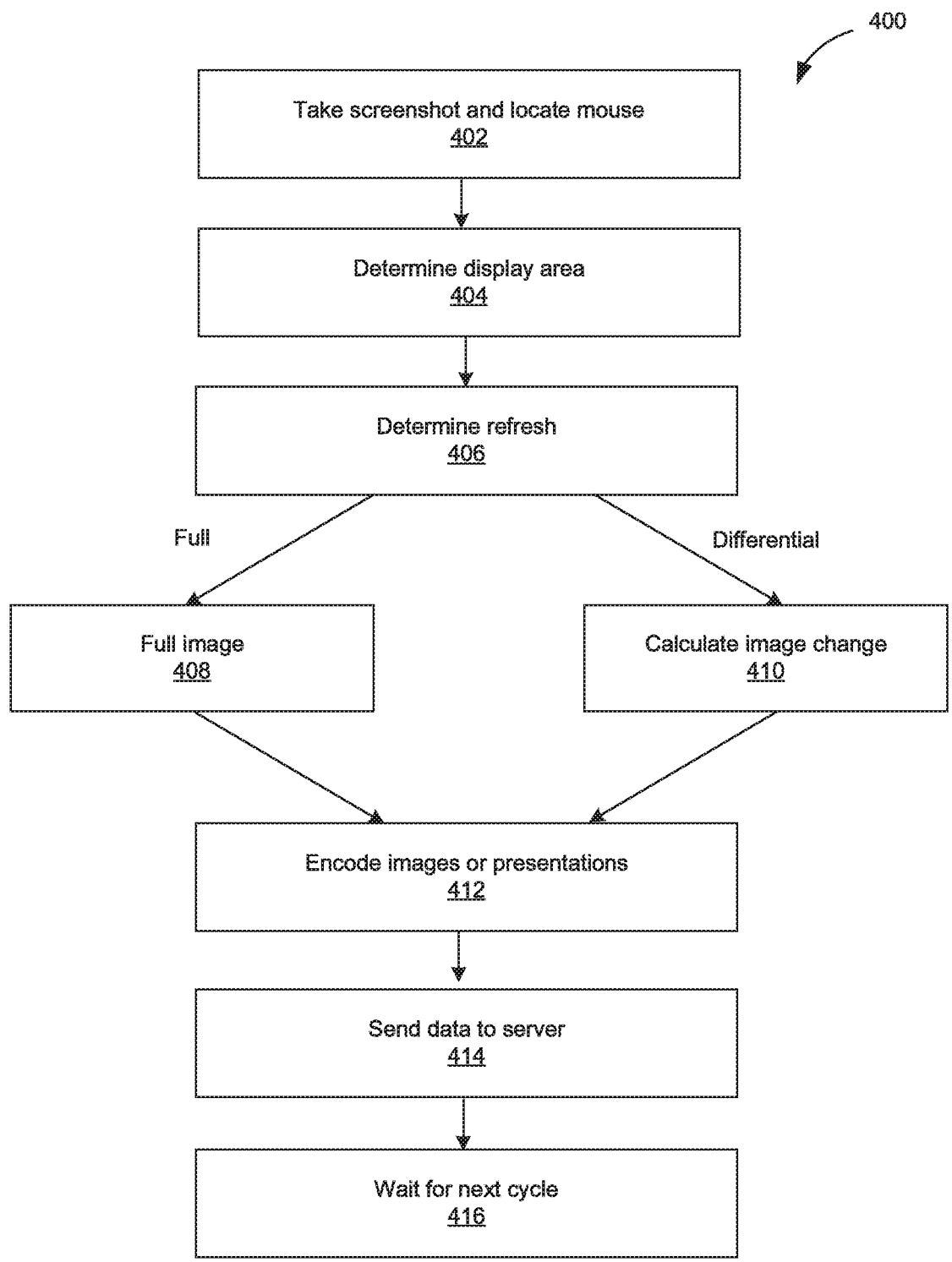
FIG. 4 depicts a flowchart illustrating an example process performed by the presenter device (e.g., as being instructed by the scripting language codes) for capturing and transmitting screen images.

For purposes of facilitating a deeper understanding of the present embodiments, various functions and configurations of system 105 are now described in conjunction with the flow charts of FIGS. 2-4 and the screenshots of FIGS. 5A-5E.

Methodology

FIG. 2 depicts a flowchart 200 illustrating an example of actions performed among the presenter device 160, presentation server(s) 140 (and optionally, control server 120), and one or more viewer devices 180 for carrying out screen sharing using the webpage script 165 that are directly executable by the presenter's web browser 164. The exemplary actions depicted in flowchart 200, upon being implemented by instructions, may be downloaded onto and performed by a presenter's device to share the presenter's screen with the viewers.

Generally, a presenter starts by providing to viewers a viewer URL that uniquely identifies the presenter. When a viewer goes to the viewer URL using a web browser, thereby loading a presentation viewing webpage, the viewer automatically sees a presentation slide or other content, such as images, selected by the presenter.

When the presenter wishes to share his screen with the viewers, a particular presentation slide that may be selected by the presenter is a "live demo" slide, which loads a live sharing webpage containing the screen sharing script 165

Figure 5A:
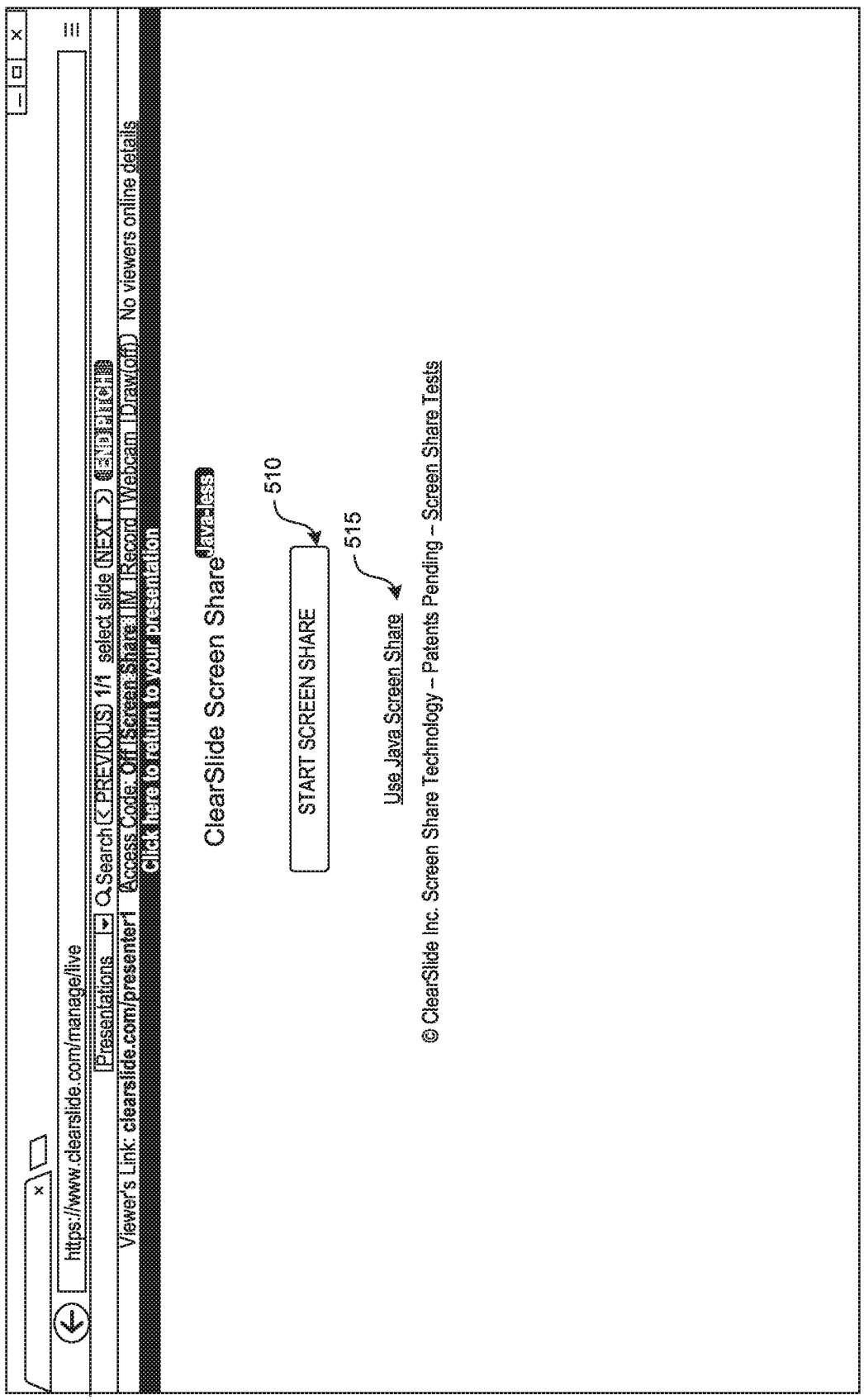
FIGS. 5A-5E show examples of various screen displays that can be generated by the screen sharing server(s) and loaded onto a presenter's device to enable the screen sharing.
Figure 5B:
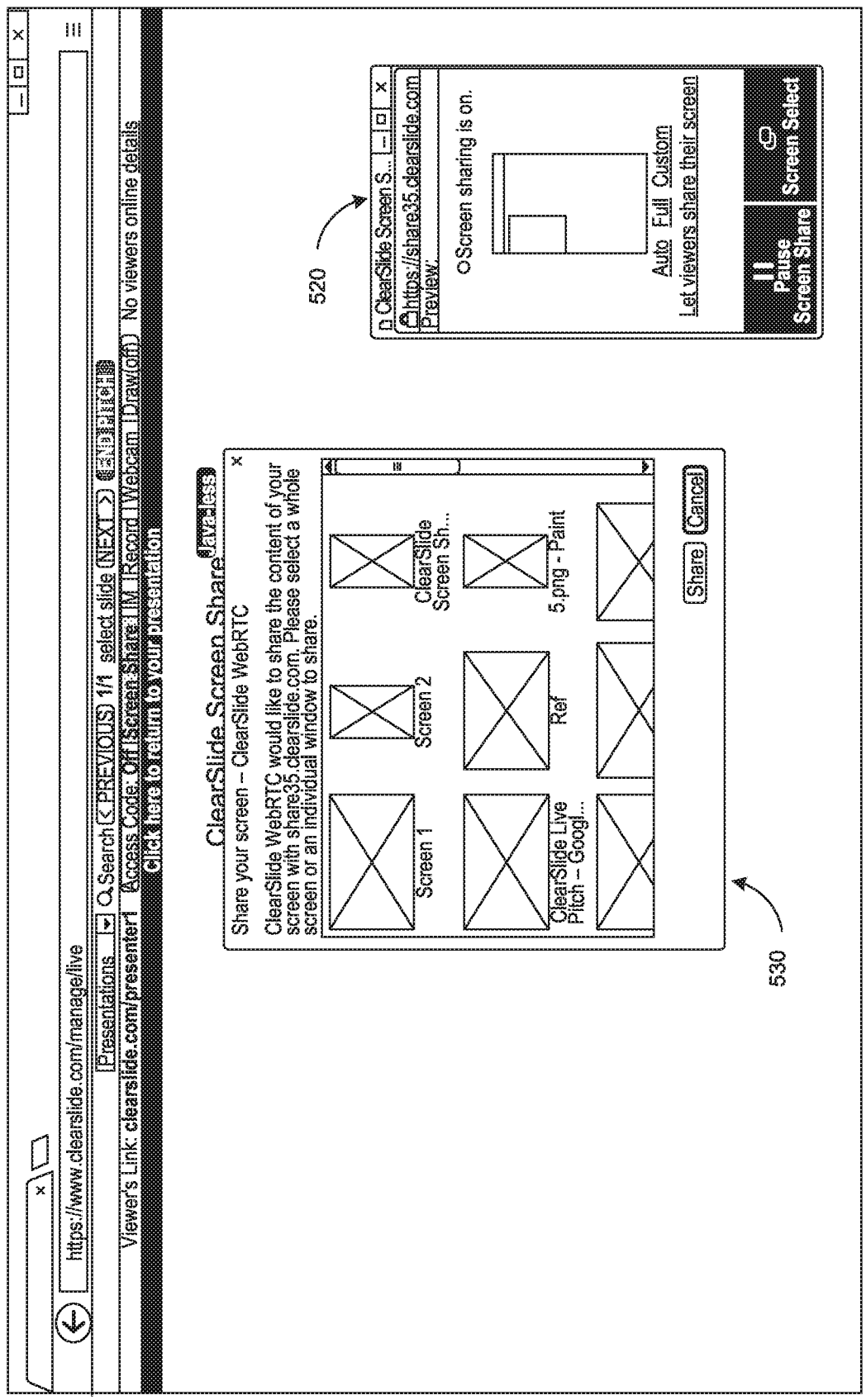
Figure 5C:
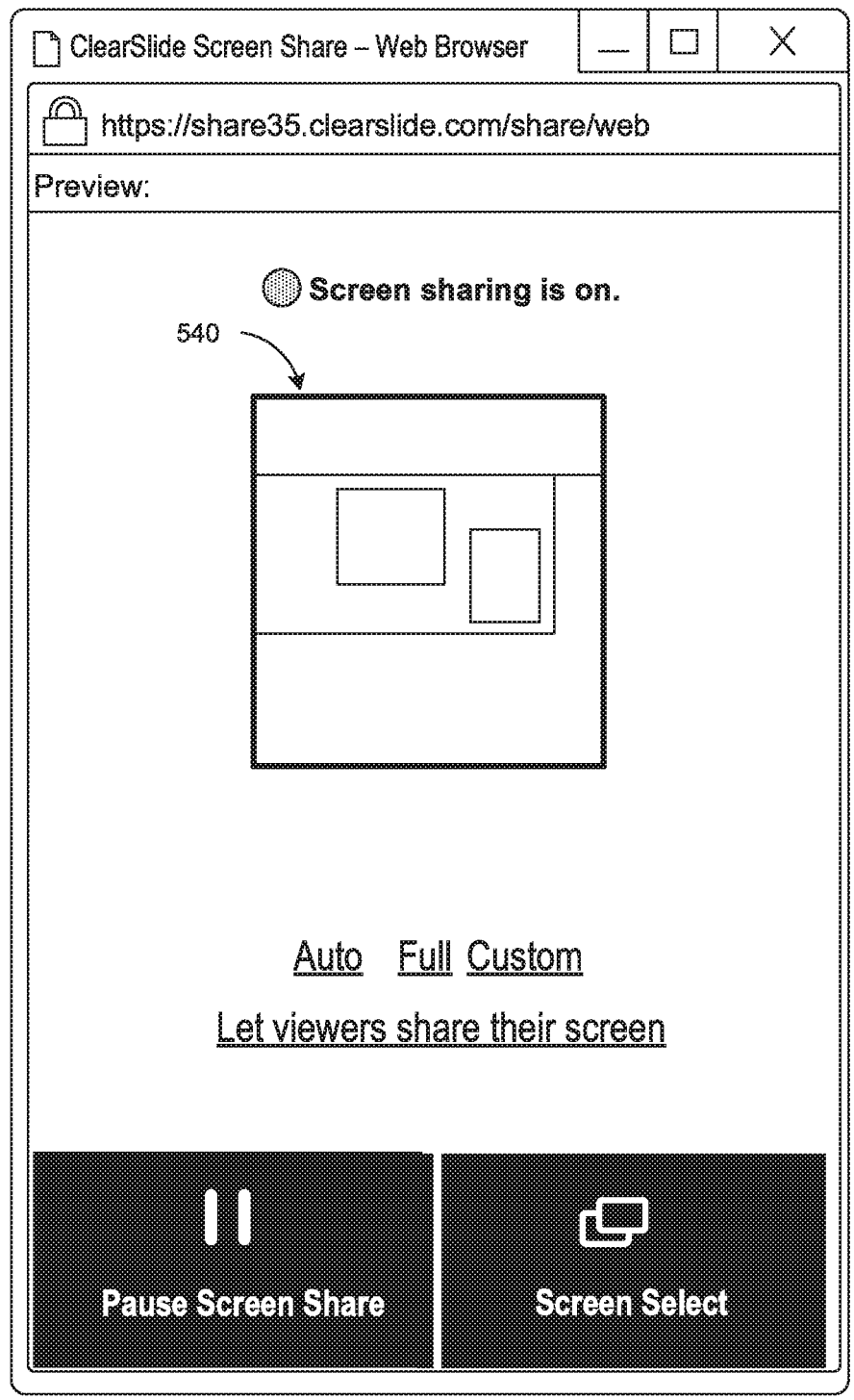

(e.g., a Javascript and/or a series of AJAX code) in a web browser 164 running on the presenter device 160. Additionally or alternatively, the presenter can select to start a live screen sharing by directly loading onto the web browser 164 the live screen sharing webpage containing the sharing script 165. An example of such live screen sharing webpage is illustrated in the screenshot of FIG. 5A. Because the script 165 is composed of scripting language codes that are directly executable by the web browser 164, the presenter does not need to download any software or plug-ins. As an option, the webpage script 165 may ask the presenter to confirm or to give permission to share the screen. Then, the webpage script 165 shares the presenter's screen with viewers who access the provided viewer URL without the viewer having to download any software or plug-ins.

More specifically, in some embodiments, when the presenter initiates a screen sharing session (e.g., by clicking on the screen sharing button 510 in FIG. 5A) the webpage script 165 start the flowchart 200 by sending (202) a request for a screen sharing server to the control server 120. Similarly, when the viewer loads the viewer's link given by the presenter onto the viewer's web browser 181, the webpage script 182 sends (203) a request to view the presentation to the control server 120. As mentioned, the control server 120 can assign (204) one or more screen sharing servers 140 among the screen sharing servers 140A-140N (e.g., of FIG. 2) to perform the screen sharing session based on their current workload, network bandwidth and availability, and/or the requestor's geographic location. Under some circumstances (e.g., when one screen sharing server is close to one viewer device while another screen sharing server is close to another viewer device), more than one screen sharing servers may be utilized for optimized screen sharing experience. Thereafter, the presenter device 160 receives (206) its screen sharing server assignment from the presentation control server 120. The viewer devices 180 also receive (205) their respective screen sharing server assignment from the presentation control server 120. During this screen sharing session establishing phase, a session key which identifies and differentiates the presenter device 160 from the viewer devices 180 may be transmitted by the control server 120 to the presenter device 160. As noted, the assignment of the screen sharing server(s) may or may not be the same, depending on the scenario. Further, in some embodiments, the presentation control server 120 may be absent, and one or more of the screen sharing servers 140A-140N may take the role of the control server 120.

Using the received screen sharing server assignment, the webpage script 165 then establishes (208) communications with the screen sharing server 140. Optionally, either the webpage script 165 or the screen sharing server 140 can detect (210) whether the web browser 164 includes capability to perform RTC with another browser. For example, in some embodiments, the web browser 164 may include built-in WebRTC capability, such as a Google Chrome™ browser. If the web browser 164 does not include built-in capability to perform plug-in-free real-time communication with another browser, the webpage script 165 can prompt (212) the presenter to load an webpage applet (e.g., webpage applet 162) or to install a plug-in to support RTC capability, such as the dialog window 560 shown in the screenshot of FIG. 5E. In variations, the webpage script 165 can allow the presenter himself to manually select (or switch) between using the script 165 and the applet 162 to perform the screen sharing, such example shown as a manually selectable link 515 in the screenshot of FIG. 5A.

If the web browser 164 does include the capability to perform real-time communication with another browser, the webpage script 165 then instructs (216) the web browser 164 to capture screen images from a display of the presenter device 160 without requiring the web browser 164 to load an applet (e.g., applet 162). In some examples, the webpage script 165 scripting language codes are configured to cause the presenter's web browser 164 to capture the screen image by issuing instructions through an application programming interface (API) of the presenter's web browser 164.

By adapting the RTC capability to its own use, the webpage script 165 can replace the functionality of the webpage applet 162, taking screenshots (or pieces of images collectively representing the designated screen sharing area), processing the screenshots, and sending them through the screen sharing server 140 to the viewer device 180. More specifically, after acquiring or parsing the pixel information on the screen (of the presenter device 160), the webpage script 165 is configured to generate and/or adjust data indicative of the captured screen image. Specifically, the webpage script 165 can perform one or more different actions to generate/adjust such data. Example actions include encoding the raw screen image (as captured by the web browser 164) into one image format, converting the image format from one to another, shrinking the resolution of the image, and/or reducing the color depth of the image. As examples, these actions can be performed in order to reduce the data size, and can be performed based on detected network bandwidth. More example processes on how to generate/adjust data (e.g., with dynamic adjustments to the captured screen) are described in FIG. 3. Then, the webpage script 165 transmits (216) the adjusted data (that remain indicative of the captured screen image) from the presenter device 160 to the screen sharing server 140 via the network 110.

As an option, when the screen sharing server 140 receives (218) the adjusted data from the presenter device 160, the screen sharing server 140 can further perform similar processes of adaptively adjusting the captured screen image using the techniques described in FIG. 3.

Next, the screen sharing server 140 processes (220) the adjusted data to form processed screen images. As mentioned above, this technique of forming processed screen images is discussed in more detail in U.S. patent application Ser. No. 12/756,110, entitled "MIXED CONTENT TYPE PRESENTATION SYSTEM." The processed screen images are to be in an image format that is natively displayable to the viewer's web browser 181. Examples of such format may include, for example, .JPG, .BMP, .GIF, and .PNG files. Note that, among other suitable reasons, because the processed screen images are in image formats natively displayable to viewers' browsers 181, the viewer webpage (which includes shared images or presentations from the presenter device 160) can be correctly displayed in the viewer's web browser 181 regardless of the browser 181's capability to perform plug-in-free real-time communication (RTC) with another browser. Among other benefits, this alleviates or even eliminates the aforementioned problems of using pure RTC for video conferencing, which would require both the presenter's and the viewer's browsers to have RTC capability.

After forming the processed screen images, the screen sharing server 140 transmits (222) the processed screen images to the viewer's device 180. The webpage script 182 on the viewer device 180 receives (224) the processed screen images, and displays (226) the images to the viewer.

Overall, the webpage script 165 utilize RTC capability to generate screenshot images and thereafter, through the system 105, share a screen with any browser. In this way, system 105 enables screen sharing without requiring special software, plug-ins, or special network configuration on either the viewer or the presenter. Because only basic images in formats that are natively displayable to the viewer's web browser 181 is being shared, the system 105 reduces or even removes the traditional problems around browser compatibility (e.g., requiring a particular plug-in or software on the viewer's browser, such as Java, Flash or even WebRTC), firewalls, network configuration, and viewer's computer user privileges (e.g., to install software or change browser configuration).

Adaptive Image Adjustment

FIG. 3 depicts a flowchart illustrating an example process 300 performed (e.g., by the presenter device 160 as being instructed by the webpage script 165, or by the screen sharing server 140) for adaptively adjusting the captured screen image.

It is further recognized in the present disclosure that, in addition to the obstacles of traditional screen sharing technique—installing software (e.g., Java), configuring firewalls and connection ports, and resolving different browsers' capabilities—another important limitation that may affect the user experience is network bandwidth. Because almost every network environment is different and its condition fluctuates, in order to maintain both the quality of the screen sharing experience as well as its efficacy, the webpage script 165 and/or the screen sharing server 140 can perform adaptive image adjustment based on the detected network bandwidth (and/or other network condition).

Accordingly, as an option or a variation, after the webpage script 165 captures screen images (via instructing the web browser 164), the webpage script 165 is further configured to detect (302) a network bandwidth between the presenter device 160 and the screen sharing server 140. Then, the webpage script 165 adaptively (or dynamically) adjust (304) the captured screen image so as to reduce an overall size of the data indicative of the captured screen image based on the network bandwidth between the presenter device and the server. For purposes of discussion herein, the terms "adaptively" and "dynamically" are used interchangeably; both terms generally mean that the function or action described is performed in response to a detected difference (e.g., a sudden drop of network speed) or that different functions are performed based on different detected levels (e.g., a 50 Mbps bandwidth versus a 500 Kbps bandwidth).

More specifically, one embodiment of the webpage script 165 can adjust the data (e.g., of the parsed pixels) by reducing (304A) an image resolution of the captured screen image. For example, by the webpage script 165 reducing an image resolution from 1000×1000 to 500×500, the webpage script 165 can reduce the raw data size to ¼. As a variation, the webpage script 165 can adjust the data by reducing (304B) a color depth (e.g., from 24-bit to 16-bit) of the captured screen image. In some embodiments, based on the results from the webpage script 165 detecting the bandwidth/condition from the presenter's side, the webpage script 165 can adaptively scale the image in both pixel dimensions and the color depth based on the available bandwidth.

In some examples, the webpage script 165 can also perform the adaptive screen image adjustments to maintain a certain frame rate. For example, in one embodiment, the webpage script 165 starts to scale down the captured screen images when the detected bandwidth is not enough to support a 2.5 frame-per-second frame rate. Note that the network bandwidth is merely one example factor on which the adaptive image adjustment may be based; other suitable factors may include, for example, an operating or a processing speed of the presenter device 160. Also, for some embodiments, the webpage script 165 can change (304C) the captured screen images to another image format, e.g., from .BMP to .PNG. In variations, the webpage script 165 and/or the screen sharing server 140 can perform one or more of these adjustments introduced here without being based on any condition or factor.

As an additional or alternative embodiment, the screen sharing server 140 may perform process 300 to improve the system 105's user experience for the viewer devices 180.

Similar to how the web script 165 performs adaptive image adjustment based on the detected network bandwidth between the presenter device 160 and the screen sharing server 140, the screen sharing server 140 can also perform adaptive image adjustment based on the detected network bandwidth between the screen sharing server 140 and one or more of the viewer devices 180. Specifically, the screen sharing server 140 can detect (302) a network bandwidth between a viewer device 180 and the server 140. Thereafter, the screen sharing server 140 can adaptively adjust (304) the processed screen image so as to reduce an overall size of the processed screen image based on the network bandwidth between the viewer device 180 and the server 140. In some embodiments, the adjusting of the processed screen image performed by the server 140 can be reducing (304A) an image resolution of the processed screen image. Additionally or alternatively, the adjusting of the processed screen image can be reducing (304B) a color depth of the processed screen image, or can be changing (304C) the format of the captured screen image to another format.

Screen Capture, Refresh and Differential Update

FIG. 4 depicts a flowchart illustrating an example process 400 performed by the presenter device (e.g., as being instructed by the webpage script 165) for capturing and transmitting screen images. The process 400 provides additional examples and details for implementing Step 214 of FIG. 2.

First, the screen sharing script 165 takes (402) a screenshot at presenter device 160 and records pointer location. As will be appreciated by a person skilled in the art, the present teaching does not involve continuous screen sharing or presentation video streaming, but rather periodic and/or triggered sharing of captured screen images or representations. Then, the script 165 determines (404) the "display area" for the presentation. In one or more embodiments, each time the screen sharing script 165 records the screen, the script first determines the "display area," i.e., the specific portion of the screen that includes the content the presenter wants to share. Often the presenter would rather show only the active window, rather than the entire screen, because this requires less scrolling on the viewer's part, especially if the viewer's window is smaller than the presenter's, and because the presenter may get pop-ups and instant messages not intended for sharing. Some embodiments provide a mechanism for determining the active window, such as a screen sharing controller 520 or a screen sharing window selection interface 530, both illustrated in FIG. 5B. In certain embodiments, this mechanism (e.g., the controller 520 or the selection interface 530) may be selectively triggered by the presenter.

Figure 5D:
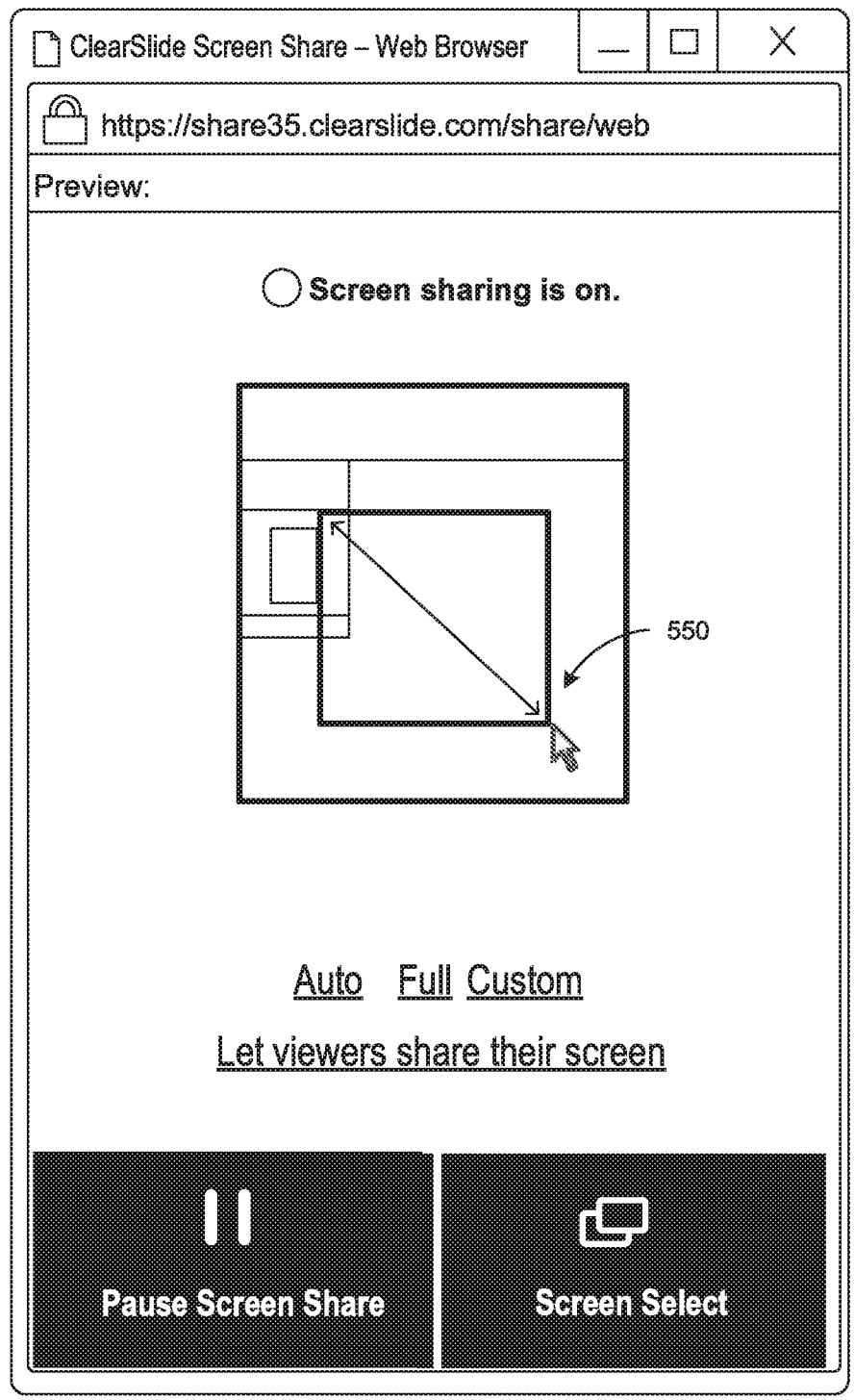
Figure 5E:
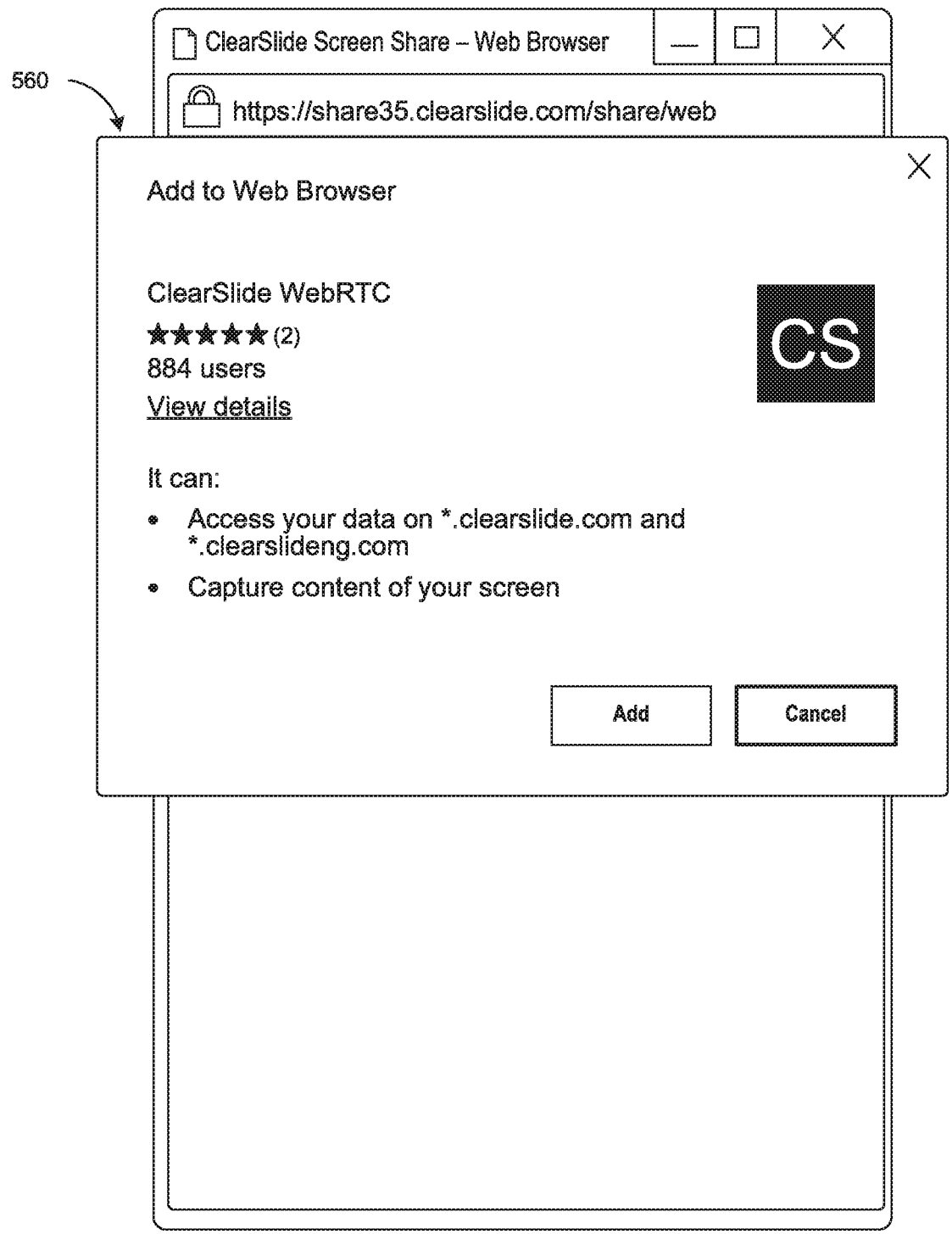

The selection interface 530, which may be an introductory screen first shown to the presenter when he or she elects to share the screen, can enable the presenter to identify which exact window that the presenter would like to share. On the other hand, the controller 520 can allow the presenter to select and customize the active sharing area that the presenter so desires. The controller 520 may include a highlighted or bolded area to identify the currently active screen sharing area, such as the active area 540 illustrated in the screenshot of FIG. 5C. Further, the controller 520 can allow the presenter to customize the active area by using a mouse cursor, for example, to drag and drop on the controller interface so as to specify a new active area 550 for the screen image to be captured, such as shown in the screenshot of FIG. 5D.

One aspect of the suitable mechanism for determining the active window includes placing an identifying image on the webpage. The webpages (whether the introductory screen sharing script webpage 530 or newly launched webpages the presenter has identified for showing) can include small unique markings. These markings can include an image strategically located in the active window. For example, the image can be placed in the corners of the display area and include a unique combination of colors (like an image-based password). Alternatively, or in addition, a one-pixel wide or multiple-pixel wide strip of a specific color can connect the markings and frame the display area. Then, the screen sharing script 165 can determine where these markings and strips are located to determine the active window. If the markings cannot be found, or the window containing the markings is significantly obscured, the screen sharing script 165 can default to identifying the presenter's entire screen as the display area, or in some implementations, allowing the presenter to manually define the active window.

Using the aforementioned techniques (e.g., via the RTC API of the presenter's web browser 164), the screen sharing script 165 can capture representations of the display area at set intervals and/or at other suitable triggering events. Each time the screen sharing script 165 captures or records the screen, the screen sharing script 165 determines (406) what to send to the server 140.

More specifically, the screen sharing script 165 can perform (408) a full refresh of the entire display area. Alternatively, the screen sharing script 165 can perform (410) a differential update by determining which areas of the display area have changed and send just the changed areas ("differential update"). In some embodiments, differential updates are sent when appropriate because full refresh takes more time and bandwidth.

In some embodiments, the screen sharing script 165 sends a full refresh only in specific circumstances such as:

(a) The presentation has just begun and the screen sharing script 165 is sending a first presentation.

(b) The presentation display area has changed.

(c) The screen sharing server 140 requested that the screen sharing script 165 send a full refresh, for example, when a new viewer comes online and requests a full refresh of the screen sharing server 140. Note that, in this way, the screen sharing server 140 does not need to maintain a "full, current image" of the presenter's screen.

(d) Most (e.g., above a specific percentage) of the active window or captured representations has changed so that there is not a large difference between an incremental update and a full update.

(e) The screen sharing script 165 has sent a maximum number of consecutive differential updates. In some embodiments, differential updates are restricted to a maximum number because certain layering methods that the viewer device 180 uses to update the screen may result in memory problems, and full updates can generally clean up minor display inconsistencies if any occurs for any reason (e.g. momentary network issues).

In the case of the differential update performed, the screen sharing script 165 compares each pixel of the current display area to the last display area, and determines the changes.

Thereafter, for each image or differential update, the screen sharing script 165 adjust the data indicative of the captured image (whether full or differential) in manners described above. Optionally, the script 165 can encode the images using one or more encoding methods so as to store the images into known formats, such as GIF, PNG, or JPEG. The screen sharing script 165 may optionally split the image or representation into multiple smaller images or representations that can be sent separately, as this may shorten the time it takes for the viewer to see at least a partial screen update. The screen sharing script 165 transmits (414) the data to the server 140. In some embodiments, the script 165 also transmits, along the data, other relevant information, including the presentation token, key, current mouse position relative to the current display area. The data can also include update images, which may include, for example, the x, y, width, height, sequence identifier and encoded image data, and/or a flag indicating a full-refresh versus differential update images. The screen sharing script 165 may choose to use a standard web encoding method, e.g. HTTP Multi-part POST, should it detect any firewall issues associated with non-standard ports or transmission methods. The screen sharing script 165 then receives a response from the screen sharing server 140, which may include a request for a refresh.

The screen sharing script 165 then waits (416) for a suitable trigger, e.g., wait period since last capture expired, to repeat the cycle at Step 406. In addition, if the screen sharing script 165 has just received a refresh request, it may start the cycle immediately, to minimize the viewer's initial wait time. In some embodiments, the script 165 can determine a frequency for refreshing the screen image based on an operating speed of a presenter device 160.

Figure 6:
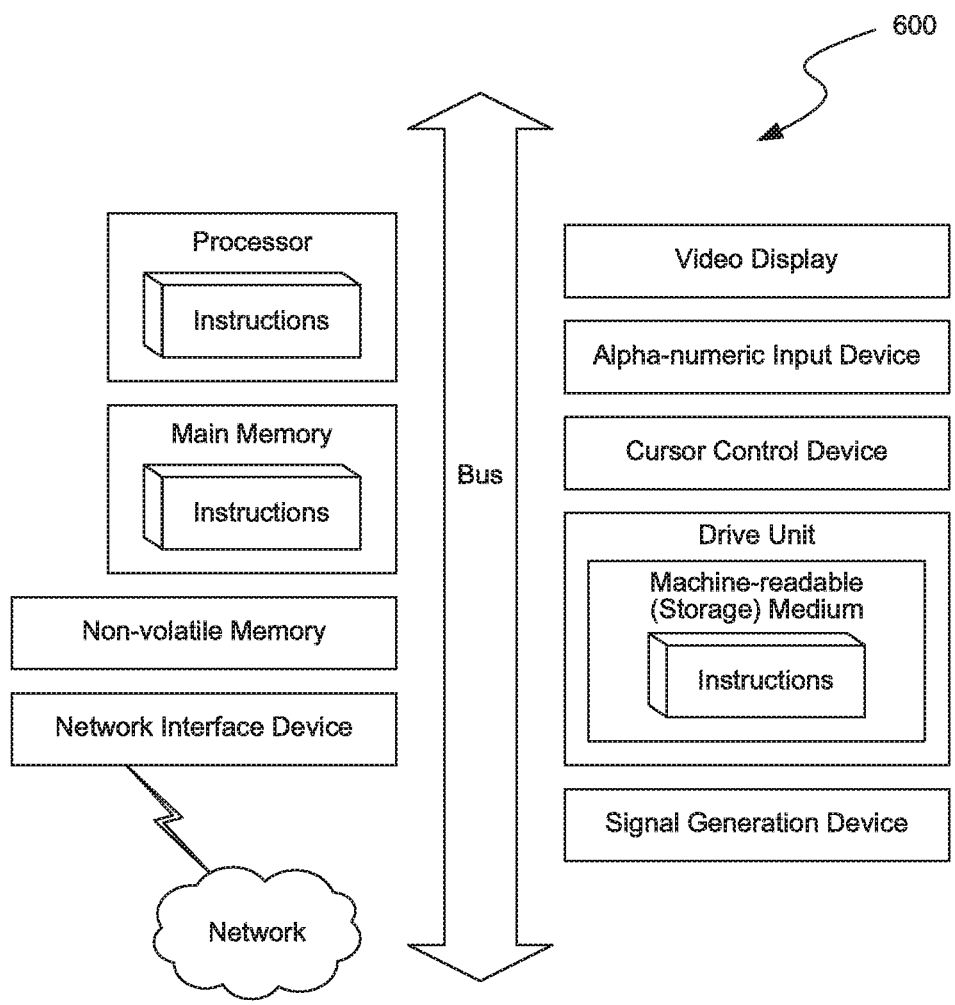
FIG. 6 depicts a diagrammatic representation of a machine in the example form of a computer system within which a set of instructions, for causing the machine to perform any one or more of the methodologies discussed herein, may be executed.

FIG. 6 depicts a diagrammatic representation of a machine in the example form of a computer system 600 within which a set of instructions, for causing the machine to perform any one or more of the methodologies discussed herein, may be executed. The computer system 600 can represent any of the devices described above, such as the presenter device 160, the control server 120, one or more of the presentation servers in the screen sharing server cluster 140A-140N, or the viewer devices 180A-180N. As noted above, any of these systems may include two or more subsystems or devices, which may be coupled to each other via a network or multiple networks.

In the illustrated embodiment, the computer system 600 includes one or more processors, memory, a communication device, and one or more input/output (I/O) devices, all coupled to each other through an interconnect. The interconnect may be or include one or more conductive traces, buses, point-to-point connections, controllers, adapters and/or other conventional connection devices. The processor(s) may be or include, for example, one or more general-purpose programmable microprocessors, microcontrollers, application specific integrated circuits (ASICs), programmable gate arrays, or the like, or a combination of such devices. The processor(s) control the overall operation of the processing device. The memory may be or include one or more physical storage devices, which may be in the form of random access memory (RAM), read-only memory (ROM) (which may be erasable and programmable), flash memory, miniature hard disk drive, or other suitable type of storage device, or a combination of such devices. The memory may store data and/or instructions that configure the processor(s) to execute operations in accordance with the techniques described above. The communication device may be or include, for example, an Ethernet adapter, cable modem, Wi-Fi adapter, cellular transceiver, Bluetooth transceiver, or the like, or a combination thereof. Depending on the specific nature and purpose of the processing device, the I/O devices can include devices such as a display (which may be a touch screen display), audio speaker, keyboard, mouse or other pointing device, microphone, camera, etc.

Unless contrary to physical possibility, it is envisioned that (i) the methods/steps described above may be performed in any sequence and/or in any combination, and that (ii) the components of respective embodiments may be combined in any manner.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

CONCLUSION

In the foregoing specification, the examples have been described with reference to specific exemplary implementations thereof. It will, however, be evident that various modifications and changes may be made thereto without departing from the broader scope of the disclosure. The specification and drawings are, accordingly, to be regarded in an illustrative sense rather than a restrictive sense. Aspects of the disclosure can be combined, separated, and/or modified, to the extent that is necessary, to employ the systems, functions, and concepts of the various references described above to provide yet further embodiments of the disclosure.

Note that, while the methods introduced here include a number of operations that are discussed and/or depicted as performed in a specific order, these methods may include more or fewer operations, which can be performed in serial or in parallel. An order of two or more operations may be changed, performance of two or more operations may overlap, and two or more operations may be combined into a single operation.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

As used herein, a "module," "a manager," an "interface," a "platform," or an "engine" includes a general purpose, dedicated or shared processor and, typically, firmware or software modules that are executed by the processor. Depending upon implementation-specific or other considerations, the module, manager, interface, platform, or engine can be centralized or its functionality distributed. The module, manager, interface, platform, or engine can include general or special purpose hardware, firmware, or software embodied in a computer-readable (storage) medium for execution by the processor.

What is claimed is:

1. A method comprising:
   receiving a request to view a presentation upon a presenter device from a viewer device;
   assigning one or more servers of a plurality of servers to perform as a screen sharing server;
   responsive to determining that a web browser of the presenter device supports web real-time communications, loading a presentation webpage in the web browser of the presenter device, wherein the presentation webpage includes a screen sharing script directly executable by the web browser to cause the web browser of the presenter device to capture a plurality of static screen images;
   receiving, by the one or more servers, data indicative of the plurality of static screen images from the presenter device, the data being generated by the screen sharing script which is configured to adjust the data indicative of the static screen images based on a network bandwidth between the presenter device and the one or more servers in order to maintain a specified frame rate of displaying the plurality of static screen images at the viewer device; and
   transmitting, by the one or more servers, the data indicative of the plurality of static screen images to the viewer device.

2. The method of claim 1, wherein the one or more servers include a presentation control server that receives control signals from the presenter device, and a presentation sharing server that transmits the presentation to the viewer device.

3. The method of claim 1, wherein the screen sharing script is configured to cause the web browser of the presenter device to capture the plurality of static screen images by issuing instructions through an application programming interface of the web browser of the presenter device.

4. The method of claim 1, wherein the screen sharing script is further configured to:
   adaptively adjust the plurality of static screen images to reduce an overall size of the data indicative of the plurality of static screen images based on the network bandwidth between the presenter device and the one or more servers.

5. The method of claim 4, wherein the screen sharing script is configured to adjust the data by performing at least one of:
reducing an image resolution of the plurality of static screen images; and
reducing a color depth of the plurality of static screen images.

6. The method of claim 1, further comprising:
adaptively adjusting the plurality of static screen images to reduce an overall size of the plurality of static screen images based on the network bandwidth between the viewer device and the one or more servers.

7. The method of claim 6, wherein the adjusting the plurality of static screen images comprises at least one of:
reducing an image resolution of the plurality of static screen images; and
reducing a color depth of the plurality of static screen images.

8. The method of claim 1, wherein the screen sharing script is further configured to:
determine a frequency for refreshing the plurality of static screen images based on an operating speed of the presenter device; and
periodically capture a static screen image at the determined frequency.

9. The method of claim 1, wherein the screen sharing script is further configured to enable a presenter to adjust a screen area to be captured.

10. The method of claim 1, wherein the screen sharing script is further configured to:
determine a difference between a first static screen image and a second static screen image; and
selectively transmit to the one or more servers one of: the second static screen image or data indicative of the difference.

11. The method of claim 1, further comprising displaying one or more markings within the presentation webpage; wherein
an active sharing area of the screen image is determined by the screen sharing script based on locations of the one or more markings within the presentation webpage.

12. The method of claim 1, wherein the screen sharing script transmits additional data relating to a pointer controlled by a presenter within an active sharing area of the screen.

13. A computer system comprising:
a memory; and
a processor communicatively coupled to the memory, wherein the processor is configured to:
receive a request to view a presentation upon a presenter device from a viewer device;
assign one or more servers of a plurality of servers to perform as a screen sharing server;
responsive to determining that a web browser of the presenter device supports web real-time communications, load a presentation webpage in the web browser, wherein the presentation webpage includes a screen sharing script directly executable by the web browser to cause the web browser to capture a plurality of static screen images;
receive data indicative of the plurality of static screen images from the web browser, the data being generated by the screen sharing script which is configured to adjust the data indicative of the static screen images based on a network bandwidth between the presenter device and the one or more servers in order to maintain a specified frame rate of displaying the plurality of static screen images at the viewer device; and
transmit the data indicative of the plurality of static screen images to viewer device.

14. The system of claim 13, wherein the screen sharing script is further configured to cause the web browser to capture the plurality of static screen images by issuing instructions through an application programming interface of the web browser.

15. The system of claim 13, wherein the screen sharing script is further configured to:
detect a network condition between the presenter device, on which the web browser operates, and the one or more servers; and
adjust the plurality of static screen images to reduce an overall size of the data indicative of the plurality of static screen images based on the network condition between the presenter device and the one or more servers.

16. The system of claim 15, wherein the screen sharing script is further configured to adjust the data by performing at least one of: reducing an image resolution of plurality of static screen images or reducing a color depth of the plurality of static screen images.

17. The system of claim 13, wherein the processor is further configured to:
detect a network condition between the viewer device, on which the web browser of the viewer device operates, and the one or more servers; and
adaptively adjust the plurality of static screen images to reduce an overall size of the plurality of static screen images based on the network condition between the viewer device and the one or more servers.

18. The system of claim 17, wherein the adjusting the plurality of static screen images comprises performing at least one of: reducing an image resolution of the plurality of static screen imaged or reducing a color depth of the plurality of static screen images.

19. The system of claim 13, wherein the screen sharing script is further configured to:
determine a frequency for refreshing the screen image based on an operating speed of the presenter device; and
periodically perform the capturing of the capture a static screen image at the determined frequency.

20. The system of claim 13, wherein the screen sharing script is further configured to enable a presenter to adjust a screen area of the screen image to be captured.

21. The system of claim 13, wherein the screen sharing script is further configured to:
determine a difference between a first static screen image and a second static screen image; and
selectively transmit to the one or more servers one of: the second static screen image or data indicative of the difference.

* * * * *